Oct. 1, 1946.   R. W. FARRELL   2,408,384
FILM VIEWING DEVICE
Filed Jan. 20, 1945
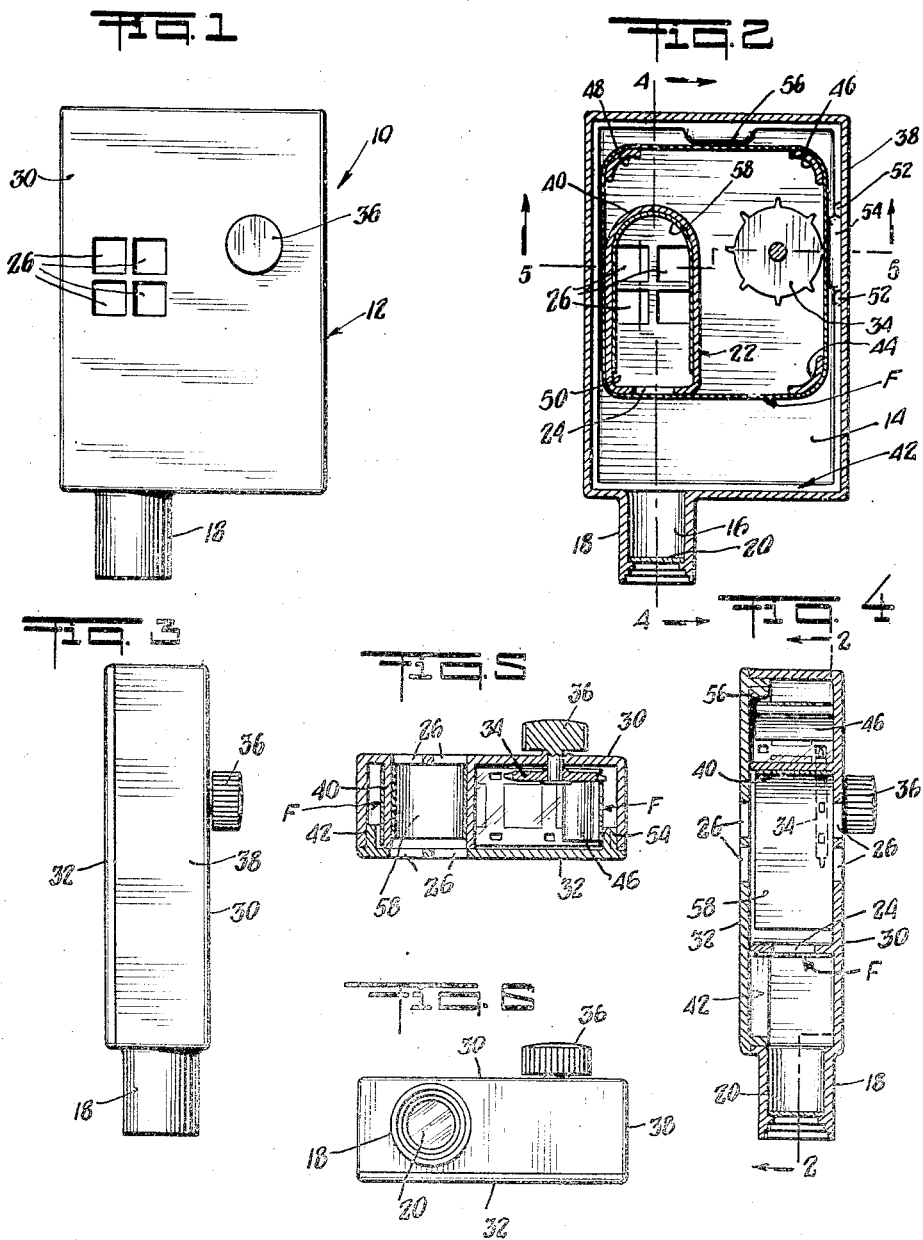
INVENTOR.
ROBERT W. FARRELL
BY Edwin Levisohn
ATTORNEYS Patented Oct. 1, 1946

2,408,384

UNITED STATES PATENT OFFICE 2,408,384

FILM VIEWING DEVICE

Robert W. Farrell, New York, N. Y.

Application January 20, 1945, Serial No. 573,651

2 Claims. (Cl. 88—17)

This invention relates to film viewing devices.

One object of the present invention is the provision of a film viewing device in which an endless film can be positioned and moved in relation to a viewing opening.

Another object is the provision of a viewing device constructed and arranged to facilitate the insertion of a film in operative movable relation to the viewing opening and to the film moving means with which the device is provided.

A further object of the invention is the provision of a film viewing device which is particularly well adapted to be used as a toy, without being limited to such use.

A further object of the invention is generally to provide a film viewing device which is simple in construction and convenient in use and operation and which can be produced at low cost.

The above and other objects, features and advantages of the invention will be fully understood from the following description, reference being had to the accompanying illustrative drawing.

In the drawing:

Fig. 1 is a plan view of a film viewing device embodying the present invention;

Fig. 2 is a sectional view on the line 2—2 of Fig. 4;

Fig. 3 is a side view in elevation of the device;

Fig. 4 is a sectional view on the line 4—4 of Fig. 2;

Fig. 5 is a sectional view on the line 5—5 of Fig. 2;

Fig. 6 is a front view of the device.

Referring now to the drawing in detail, the film viewing device 10 embodying the present invention is preferably formed by molding the same from a suitable plastic but can be formed of any other suitable material or combinations of different materials. As here shown, said device is in the form of a casing 12 defining a chamber 14 within which an endless film F is mounted for movement in relation to a viewing opening 16 provided in a tubular member 18 having a magnifying lens 20 mounted therein. A light compartment 22 is positioned within chamber 14 and is provided with a light outlet 24 across which the film travels and which registers with the viewing opening 16. Light entrance openings 26 and 28 for light compartment 22 are provided, as here shown, in the opposite side walls 30 and 32, respectively, of casing 12. A sprocket wheel 34 is disposed within the chamber 14 of casing 12 and is rotated by an externally disposed knob 36 for moving the film bodily to bring successive films or portions thereof in line with the viewing opening 16 and the light outlet 24 of the light compartment so that successive portions of the film may be viewed while knob 36 is rotated.

Casing 12 is preferably formed in two parts. One of said parts comprises the side wall 30 and the peripheral wall 38 and the other of said parts comprises the removable side wall or cover 32. The part which comprises side wall 30 and peripheral wall 38 may be molded or otherwise formed in one piece, and the tubular viewing member 18 is preferably formed integrally with the front portion of peripheral wall 38. The light compartment 22 is defined by a peripheral wall 40 which is preferably integral with side wall 30, said peripheral wall extending widthwise from the inner surface of side wall 30 to the inner surface of the opposite side wall 32. Peripheral wall 40 is imperforate except at the light outlet opening 24 which is provided therein. When a film F is mounted in chamber 14, light outlet opening 24 is sealed by said film and since the light compartment is otherwise in light sealed relation with respect to chamber 14, only the portion of the film which passes across light outlet opening 24 is illuminated. It will be understood that light inlet openings 26 and 28 communicate only with the interior of light compartment 22 and that chamber 14 is completely closed to the entrance of light except that which passes through light outlet opening 24 and through the film when the latter is mounted within the casing in chamber 14. Side wall or cover 32 of casing 12 is provided with a continuous peripheral flange 42 which fits snugly within peripheral wall 38 in frictional engagement therewith.

The device is provided with means for mounting the endless film in chamber 14 for movement around the light compartment 22 and across openings 16 and 24 in registry therewith in the space between said openings. As here shown, said mounting means comprises the mounting members 44, 46 and 48 and also a portion 50 of peripheral wall 40 of light compartment 22, said members 44, 46 and 48 and said peripheral wall portion 50 having arcuately curved surfaces which the film F slidably engages during the movement of said film by sprocket wheel 34. Members 44, 46 and 48, which are all of the same construction, are preferably formed integrally with side wall 30 of the casing and extend from the inner surface of said side wall close to the inner surface of the opposite side wall 32. It will be noted that the film guiding and mounting means including members 44, 46 and 48 are positioned in chamber 14 so that the film is spaced from the inner surface of peripheral wall 38 and from the inner surface of flange 42 of side wall 32. The portion of peripheral wall 38 adjacent sprocket wheel 34 is provided on its inner surface with spaced ribs 52 which confront the adjacent peripheral edge portion of the sprocket wheel in position to hold the portion of the film against substantial movement away from the edge of the sprocket wheel whereby to improve the operative engagement of the sprocket wheel in the sprocket holes of the film, this effect being improved by a transverse rib 54 (Figs. 2 and 5) provided on flange 42 of side wall 32. As shown in Fig. 2 flange 42 is also provided with another lateral rib 56 which is positioned to be slidably engaged by the portion of the film passing between guide and mounting members 46 and 48. It will be understood that when side wall or cover 32 is removed, the film can be inserted in and removed from the chamber 14 through the open side of the casing.

As will be readily understood the viewing device can be used without requiring a lamp in the light compartment 22, since said light compartment is illuminated by light which enters said compartment through the light entrance openings 26 and 28, and said light can be either daylight or artificial light of an illuminated room or of a lamp positioned externally of casing 12 in light transmitting relation with the interior of light compartment 22. However, it is within the scope of the present invention to provide a lamp within the light compartment 22. Preferably, the inner surface of peripheral wall 40 of the light compartment or the portion thereof which confronts light outlet opening 24 is provided as illustrated with a white or other light colored light reflecting paper or other sheet material 58, or alternatively said peripheral wall can be formed of white or light colored material or its inner surface can be white or of other light reflecting color. Also, it will be understood that when a lamp is provided within compartment 22, the device can be used to project the film through opening 16 onto a viewing screen, suitable lenses being provided, if desired in compartment 22 and in opening 16. The above described viewing device is intended primarily for use with endless films of standard 16 mm. width, but can be made in any suitable size for use with films or other transparencies of any other suitable width.

While I have shown and described the preferred embodiment of my invention, it will be understood that various changes may be made therein without departing from the underlying idea of the invention within the scope of the appended claims.

Having thus described my invention, what I claim and desire to secure by Letters Patent is:

1. A film viewing device comprising a casing having a removable cover at one side thereof, means within said casing for mounting an endless film insertable edgewise into said casing through the open side thereof when the cover is removed, a light compartment within said casing and positioned therein so that the film travels around said light compartment externally thereof when said film is moved for the viewing of successive portions thereof, said light compartment having a light outlet opening closed by the film when the latter is mounted in said casing, said compartment having a peripheral wall extending in the direction of the width of the film and laterally between said cover and the side of said casing which is opposite said cover, said light-compartment having a light-inlet opening in the plane of one of said sides of the casing, said casing having a peripheral wall provided with a viewing opening in registry with said light outlet opening in spaced relation thereto, and means for moving said film across said openings in the space therebetween.

2. A film viewing device comprising a casing having a removable cover at one side thereof, means within said casing for mounting an endless film insertable edgewise into said casing through the open side thereof when the cover is removed, a light compartment within said casing and positioned therein so that the film travels around said light compartment externally thereof when said film is moved for the viewing of successive portions thereof, said light compartment having a light outlet opening closed by the film when the latter is mounted in said casing, said compartment having a peripheral wall extending in the direction of the width of the film and laterally between said cover and the side of said casing which is opposite said cover, said light-compartment having a light-inlet opening in the plane of one of said sides of the casing, said casing having a peripheral wall provided with a viewing opening in registry with said light outlet opening in spaced relation thereto, said film mounting means including a peripherally extending portion of said peripheral wall of said light compartment, said peripheral wall portion being disposed adjacent a confronting peripheral wall portion of the casing, and stationary means disposed adjacent a peripheral wall portion of the casing opposite said first mentioned peripheral casing-wall portion and means for moving said film across said openings in the space therebetween.

ROBERT W. FARRELL.